(12) United States Patent
Schlipf et al.

(10) Patent No.: US 9,274,015 B2
(45) Date of Patent: Mar. 1, 2016

(54) DEVICE AND METHOD FOR MEASURING SECTIONAL FORCES

(71) Applicant: Airbus Operations GmbH, Hamburg (DE)

(72) Inventors: Bernhard Schlipf, Bremen (DE); Matthias Giese, Oerlinghausen (DE)

(73) Assignee: Airbus Operations GmbH, Hamburg (DE)

( * ) Notice: Subject to any disclaimer, the term of this patent is extended or adjusted under 35 U.S.C. 154(b) by 73 days.

(21) Appl. No.: 14/182,854

(22) Filed: Feb. 18, 2014

(65) Prior Publication Data

US 2014/0230569 A1    Aug. 21, 2014

Related U.S. Application Data

(60) Provisional application No. 61/766,205, filed on Feb. 19, 2013.

(30) Foreign Application Priority Data

Feb. 19, 2013  (DE) .......................... 10 2013 202 647

(51) Int. Cl.
  *G01L 5/16*    (2006.01)
  *G01L 1/22*    (2006.01)
(52) U.S. Cl.
  CPC .............. *G01L 5/161* (2013.01); *G01L 1/2287* (2013.01)
(58) Field of Classification Search
  CPC ..... G01L 1/2287; G01L 1/205; G01L 1/2206; G01L 1/2243; G01L 5/161; G01L 5/16
  USPC ........ 73/862.044, 862.043, 862.042, 862.041
  See application file for complete search history.

(56) References Cited

U.S. PATENT DOCUMENTS 3,618,376 A * 11/1971 Shull et al. ............... 73/862.045
4,065,962 A *  1/1978 Shoberg .................... 73/862.628
4,785,673 A * 11/1988 Aumard .................... 73/862.632
4,911,024 A *  3/1990 McMaster ................ 73/862.044

(Continued)

FOREIGN PATENT DOCUMENTS

DE         41 14 093 A1   11/1992
DE         694 32 541 T2   4/2004

OTHER PUBLICATIONS

German Search Report for Application No. 10 2013 202 647.1 dated Oct. 21, 2013.

*Primary Examiner* — Lisa Caputo
*Assistant Examiner* — Philip Cotey
(74) *Attorney, Agent, or Firm* — Jenkins, Wilson, Taylor & Hunt, P.A.

(57) ABSTRACT

A device and a method are disclosed for measuring sectional forces on a single-piece structural element in respect of a sectional plane by strain gauges, wherein a first and a second strain gauge of the plurality of strain gauges are arranged on a first outer wall, and a third and a fourth strain gauge are arranged on a second outer wall, with the result that, when the structural element is loaded with a first force, the change in length of the first and third strain gauges is opposite to the change in length of the second and fourth strain gauges, wherein the first outer wall and the second outer wall have, in the region of a cavity, at least three openings, which are separated from each other by webs, and wherein the first, second, third and fourth strain gauges are arranged on the webs.

15 Claims, 3 Drawing Sheets

(56) References Cited

U.S. PATENT DOCUMENTS

| | | | |
|---|---|---|---|
| 5,063,788 A | 11/1991 | Ch'Hayder et al. | |
| 5,186,042 A * | 2/1993 | Miyazaki | 73/862.041 |
| 6,032,520 A * | 3/2000 | Miyazaki | 73/862.631 |
| 2003/0097886 A1 * | 5/2003 | Miyazaki | 73/862.046 |
| 2004/0045372 A1 * | 3/2004 | Liu et al. | 73/862.041 |
| 2013/0061689 A1 * | 3/2013 | Mehlmauer et al. | 73/862.045 |
| 2013/0068037 A1 * | 3/2013 | Siklos et al. | 73/862.045 |

* cited by examiner

DEVICE AND METHOD FOR MEASURING SECTIONAL FORCES

CROSS-REFERENCE TO RELATED APPLICATIONS

This application claims priority to and the benefit of U.S. Provisional Patent Application Ser. No. 61/766,205 and to German Patent Application Serial No. 10 2013 202 647.1, both of which were filed Feb. 19, 2013, the entire disclosures of which are both incorporated by reference herein.

TECHNICAL FIELD

The present invention relates to a device and a method for measuring sectional forces.

BACKGROUND

The present invention relates to a device and a method for measuring sectional forces on a single-piece structural element with respect to a sectional plane by means of a plurality of strain gauges, wherein the structural element has a first and a second outer wall, which run perpendicular to the sectional plane, extend in a mirror-symmetrical manner in relation to each other about a first mirror plane of symmetry and are connected by further outer walls, wherein the first mirror plane of symmetry extends perpendicularly to the sectional plane, wherein each strain gauge has a measurement direction, and the electrical resistance of the strain gauge is a function of the length of the strain gauge in the measurement direction, wherein a first and a second strain gauge of the plurality of strain gauges are arranged on the first outer wall, and a third and a fourth strain gauge of the plurality of strain gauges are arranged on the second outer wall, wherein the strain gauges are arranged such that, when the structural element is loaded with a first force acting parallel to the sectional plane and parallel to the first mirror plane of symmetry, the first and third strain gauges undergo an identically oriented change in length in the measurement direction, the second and fourth strain gauges undergo an identically oriented change in length in the measurement direction, and the change in length of the first and third strain gauges is converse or opposite to the change in length of the second and fourth strain gauges.

By a sectional force or sectional magnitude or sectional reaction is meant the action of forces and torques within a structural element or component. These are the forces that must be applied or brought up by a structural element in order not to fail under the action of external forces or torques. Sectional forces or, also, sectional reactions, cannot be viewed from outside a structural element. In order for the forces and torques acting in the structural element to be made visible, a structural element must be notionally cut along a sectional plane, hence the name. Sectional forces become externally visible as a result of deformations of the structural element subjected to the action of a force or torque. The deformation of a structural element is manifested on its surface, in that the surface—depending on an acting force or acting torque and as a function of the location under consideration—undergoes stretching or compression.

The surface changes in the form of elongations or compressions can be measured by means of so-called strain gauges. A strain gauge is an electrical resistor, the resistance value or, simply, resistance, of which depends on the length of the strain gauge in the measurement direction. If the strain gauge is elongated, i.e. its length becomes greater in the measurement direction, then the electrical resistance of the strain gauge increases. Conversely, the electrical resistance of the strain gauge decreases when the strain gauge becomes compressed or shorter. Strain gauges are designed such that they have an unambiguous measurement direction, or measurement axis, which is characterized in that the change in resistance upon a change in length in the measurement direction, or along the measurement axis, is much greater than upon a change in length in other directions. In particular, strain gauges are preferably constructed such that a change in length perpendicular to the measurement direction results only in a minimal change in resistance.

In order to measure the elongation or compression of a surface of a structural element, the strain gauge is fixed to the surface in a suitable manner. If a force then acts on the structural element, and the surface of the structural element deforms in the region in which the strain gauge is arranged, the electrical resistance of the strain gauge changes. The change in the resistance is obviously greatest in the case when the surface of the structural element deforms parallel to the measurement direction of the strain gauge. It must be taken into consideration, however, that a structural element that is elongated perpendicular to the measurement direction of a strain gauge is normally compressed in the direction of the strain gauge. An elongation of the surface of a structural element in one direction therefore normally results in a measurable compression of a strain gauge the measurement direction of which runs perpendicular to the direction of elongation.

The length of the strain gauge therefore does not only change when the surface of the structural element is elongated parallel or perpendicular to the measurement direction of the strain gauge. In order to be able to determine the direction of an elongation or compression of the surface, several strain gauges, the measurement directions of which are oriented in differing directions, are attached one above the other or close to one another on the same surface. With a suitable arrangement of the strain gauges, the direction of the elongation of the surface of the structural element can be determined from the change in resistance of the various strain gauges.

This, however, is not sufficient for determining whether the deformation is produced by a force or a torque. For this purpose, distributed arrangements of preferably four strain gauges are used, of which two are compressed and two are elongated in each case when a particular force or a particular torque acts on the structural element. Preferably, the strain gauges are arranged such that different strain gauges are elongated or compressed, depending on whether the torque or the force is acting on the structural element.

Likewise, the state of the art has for a long time included the determination of the resistance of the strain gauges. Measurement of the electrical resistance is preferably not effected directly, but by means of a so-called Wheatstone bridge, or Wheatstone measuring bridge. An example of a Wheatstone bridge 1 is represented in FIG. 1. The Wheatstone bridge comprises four resistors 3, 5, 7, 9. A first resistor 3 and a second resistor 5 are connected in series. A supply voltage 11 drops across the first and the second resistor 3, 5. A third resistor 7 and a fourth resistor 9 are likewise connected in series and in parallel to the first and the second resistor 3, 5, such that the supply voltage 11 also drops across the third and the fourth resistor 7, 9. Furthermore, the Wheatstone bridge 1 comprises a voltmeter 13, which measures the voltage drop between a node in the connection of the first and the second resistor 3, 5 and a node in the connection of the third and the fourth resistor 7, 9. The voltmeter 13 does not measure any voltage drop precisely when the ratio of the first resistance 3 to the second resistance 5 corresponds to the ratio of the fourth resistance 9 to the third resistance 7. Measurable voltage drops, from which the magnitude of the change in resistance can be determined, occur on the voltmeter 13 already if there are even small changes in one of the resistances 3, 5, 7, 9. The precise mode of operation of the Wheatstone bridge 1 and the calculation of the changes in resistance are sufficiently known in the state of the art, and are therefore not discussed further here.

As is already evident from the above representation, the Wheatstone bridge is eminently suitable for determining the changes in resistances. Preferably, therefore, in a structure for measuring sectional forces, four strain gauges are used, which are coupled such that even a slight change in the length of the four strain gauges, and therefore in their resistances, relative to one another, results in as large as possible a voltage drop on the voltmeter. If, for example, a force results in the surface of a structural element undergoing elongation in one direction and compression in the direction perpendicular to the latter, then, for the purpose of observing the effect of this force, two strain gauges are preferably arranged such that their measurement direction extends parallel to the direction of elongation, and two strain gauges are arranged such that their measurement direction lies parallel to the direction of compression. In the case of the exemplary embodiment of a Wheatstone bridge represented in FIG. 1, the strain gauges that correspond to the first and third resistors 3, 7 would be arranged, for example, such that they undergo stretching, and the strain gauges that correspond to the second and fourth resistors 5, 9 would be arranged such that they undergo compression. Then, owing to the action of force, even small changes in the surface of the structural element result in measurable drops in voltage across the voltmeter 13.

However, such an arrangement is not necessarily advantageous, since, for example, a force and a torque acting perpendicular to the force can cause a change of length of the four strain gauges in the same direction. In other words, it is not possible to determine whether the change in resistance has been caused by the torque or by the force. It can therefore be advantageous to arrange the strain gauges at an angle in relation to a preferred direction of elongation, with the result that, upon action of the force that is to be observed, for example the first and third strain gauges undergo elongation and the second and fourth strain gauges undergo compression and, upon action of the torque on the structural element, the first and fourth strain gauges undergo elongation and the second and third strain gauges undergo compression. If the relative changes in magnitude of the electrical resistances of the strain gauges are equal in both cases, then, in the case of the described interconnection of the strain gauges, there is a voltage drop across the voltmeter only when the force is acting on the structural element. Under the action of the torque, by contrast, the ratio of the resistances does not alter, with the result that there is no voltage drop across the voltmeter. Such circuits are sufficiently known from the state of the art.

In any case, however, it is to be noted that the resolution of the Wheatstone bridge is limited with regard to the magnitude of the changes in resistance. In the case of particularly stiff structural elements made of stretch-resistant materials, the change in the length of the strain gauges is often so slight that they cannot be measured even with a Wheatstone bridge. However, precisely in the case of components subjected to large loads, and above all also to varying loads, over long periods of time, it is important to be able to determine with precision the forces and torques acting on the structural element or component. This is not possible with sufficient certainty by means of the arrangements known from the state of the art.

SUMMARY

It is therefore the object of the present invention to provide a device and a method by means of which sectional forces in a single-piece structural element can be measured in a reliable manner.

The present invention achieves this object, on the one hand, by a device or apparatus with a structural element which has a cavity. The first outer wall has, in the region of the cavity, at least three openings, which are separated from each other by webs and connect the cavity to the exterior of the structural element, and the second outer wall likewise has, in the region of the cavity, at least three openings, which are separated from each other by webs and connect the cavity to the exterior of the structural element.

Within the framework of the present application, by an outer wall of a structural element is meant not only a wall portion of the structural element that delimits the cavity, but also corresponding outer regions of solid portions of the structural element. Any outer surface of the structural element is thus part of a corresponding outer wall. Two outer walls are not necessarily separated from each other by edges. Rather, the term outer wall can also denote a portion of a surface. In the case of an elongated cuboid or rectangular structural element, the latter has, for example, four outer walls along its direction of extension or longitudinal direction, as well as, in each case, an outer wall at each end face. The outer surface of a, for example, cylindrical structural element is constituted merely by a lateral or circumferential surface and two end faces. Both the circumferential surface and the end faces can be readily divided into several outer walls. In particular, the circumferential surface can be divided, for example, into four outer walls. The openings and webs of the first outer wall are arranged in a mirror-symmetrical or surface-symmetrical manner about the first mirror plane of symmetry in relation to the openings and webs of the second outer wall, i.e. they have the same arrangement and preferably also the same dimensions. The first, second, third and fourth strain gauges are arranged on the webs, and the webs of each outer wall extend away from a common point.

In the case of a device according to the invention, the structural element is thus weakened in a targeted manner in the region in which the sectional forces or sectional reactions are to be measured. The cavity in the structural element in combination with the openings in the outer walls weakens the stiffness of the structural element in comparison with a solid structural element. The webs between the openings, on which the strain gauges are arranged, undergo comparatively greater changes in length for the same action of force. The electrical resistance therefore also changes to a greater extent than in the case of a solid component, with the result that even small actions of force or torque, which would not be visible in the case of the solid component or structural element, result in measurable changes in the electrical resistances of the four strain gauges. The device according to the invention can be used for example to determine, on a test stand, the forces and torques exerted on a wing structure or airfoil structure, for example in a spar of a wing, by a landing-flap arrangement.

The device according to the invention makes it possible to measure sectional forces with respect to a sectional plane in a single-piece structural element or, also, workpiece or component which, in particular, can be and preferably is made of a particularly stiff material. The structural element is normally solid and comprises at least four outer walls. Two of these outer walls, the first and the second outer wall, extend perpendicular to a sectional plane and are arranged in a mirror-symmetrical manner about a first mirror plane of symmetry. The first and the second outer walls can be, for example, opposite outer walls of a structural element having a rectangular cross-section, which opposite outer walls extend parallel to each other and parallel to the mirror plane of symmetry and extend perpendicular to the sectional plane. The further outer walls of the exemplary structural element, which connect the first and the second outer wall to each other, are then each constituted by a flat outer surface and adjoining structural-element portions that extend perpendicular to the first and second outer walls and perpendicular to the sectional plane. However, the further outer walls can also assume other shapes. In an alternative exemplary embodiment, the structural element has a circular or elliptical cross-section. For example, the structural element can be a cylinder. In this case, the lateral or circumferential surface is divided into four outer walls, of which the first and the second lateral surface are arranged in a mirror-symmetrical manner in relation to each other. The first mirror plane of symmetry, which extends perpendicular to the sectional plane, serves as the plane of symmetry.

The structural element has a cavity that is surrounded, or delimited, by the outer walls. It is quite conceivable in this respect for the structural element, in the state in which it is to be used in a product, actually to be solid and not to have a cavity, and for the cavity to be introduced merely to weaken the structural element in a targeted manner for the purpose of an analysis preceding the actual use. A structural element provided with a cavity undergoes greater deformation, for the same load, than a solid structural element of the same dimensions.

Two strain gauges are arranged on each of the first and the second outer wall, in order to measure the deformation of the structural element under the action of a first force acting on the structural element parallel to the first mirror plane of symmetry and also parallel to the sectional surface. The first force is therefore a transverse force.

The strain gauges are arranged on the first and the second outer wall such that, even in the case of small changes in resistance, voltage drops that are as large as possible can already be measured across a voltmeter of a Wheatstone bridge, wherein the strain gauges are interconnected in order to form that Wheatstone bridge. A first and a second strain gauge are arranged on the first outer wall such that the length of the first and of the second strain gauge changes in opposite directions when the first force acts on the structural element. In other words, if the first force acts on the measuring article or object and the first strain gauge becomes longer in the measurement direction, the second strain gauge becomes shorter in the measurement direction. If, for example, a Wheatstone bridge as represented as an exemplary embodiment in FIG. 1 is used to measure the change in resistance, the first strain gauge could be used as first resistor 3 and the second strain gauge could be used as second resistor 5.

A third and a fourth strain gauge are arranged on the second outer wall. Here, also, it is the case that the third and fourth strain gauges are arranged in relation to each other such that the third strain gauge and the fourth strain gauge change their lengths in converse or opposite directions in the measurement direction when the first force acts on the structural element. In other words, the third strain gauge becomes longer when the fourth strain gauge becomes shorter, and vice versa. In the exemplary embodiment of a Wheatstone bridge 1 represented in FIG. 1, the third strain gauge could be used, for example, as third resistor 7, and the fourth strain gauge could be used as fourth resistor 9.

The arrangement of the strain gauges is further limited in that the change in length of the first strain gauge must be effected in the same direction as the change in length of the third strain gauge, when the first force acts on the structural element. The arrangement of the second and fourth strain gauges is also further limited, since they also must undergo an identically oriented change in length in the measurement direction when the first force acts on the structural element. For this purpose, the first and second strain gauges could be arranged, for example, in a mirror-reversed or mirror-inverted manner with respect to the third and fourth strain gauges. In this exemplary embodiment, the angle of the measurement direction of the first strain gauge in relation to the sectional plane corresponds to the angle between the measurement direction of the third strain gauge and the sectional plane. Equally, the angle between the measurement direction of the second strain gauge corresponds to the angle at which the fourth strain gauge is inclined in relation to the sectional plane.

For example, the first and third strain gauges can be applied, parallel to the sectional plane, to the first and second outer wall, respectively, and the second and fourth strain gauges can be applied, perpendicular to the sectional plane, to the respective outer wall. The alignment of a strain gauge, even if this is not stated expressly, is always stated in respect of the alignment of its measurement direction, i.e. the inclination of a strain gauge with respect to a plane or a straight line always relates to the inclination of the measurement direction of the strain gauge with respect to this plane or straight line.

The first and second outer walls each have at least three openings in the region of the cavity. The openings are separated from each other by webs, and connect the cavity of the structural element to the exterior, or environment, of the structural element. Thus, in the case of a previously solid structural element, besides the cavity that has been introduced into the structural element, additional openings, which further weaken the structural element, are now introduced into the first and the second outer wall, before the actual measurement of the sectional forces. As a result of this, the portions of the first and second outer walls that remain in the region of the cavity and that are constituted by the webs extend to a significantly greater extent, or are compressed to a significantly greater extent. The first, second, third and fourth strain gauges are therefore arranged on the webs. In this regard, it is preferred if the webs have a greater extent or extension in the measurement direction of the strain gauges applied thereto than perpendicular to the measurement direction. In the extreme case, the extension of a web perpendicular to the measurement direction of the strain gauge attached thereto could be reduced to the extension of the strain gauge perpendicular to the measurement direction. Such webs undergo a particularly large change in length parallel to the measurement direction, thereby making it possible to measure particularly large resistance changes and the effect of small first forces.

The arrangement of the webs is furthermore limited in that all webs of an outer wall extend away from the same point. If an outer wall has, for example, three openings, the latter could be separated from each other by two webs arranged in a V shape. Alternatively, three webs could also be used to separate the three openings from each other, which webs are arranged in the form of a Y or a T. If, on the other hand, in an exemplary embodiment, four openings are provided per outer wall, the webs can be arranged, for example, in the form of a cross or an X. In each case, the webs form a kind of latticework, framework or truss that at least partially replaces the first and the second outer wall in the region of the cavity. It is to be noted here, however, that the webs and the structural element are formed as a single piece, and are not constituted by a latticework that has been subsequently inserted into the structural element.

The openings in the first and second outer walls, and the webs arranged between them, are arranged in a mirror-symmetrical manner in relation to each other about the first mirror plane of symmetry. They are opposite one another in each case. In other words, the first outer wall is provided with openings that represent a mirror-image arrangement of the openings of the first outer wall, wherein the mirroring is effected at the first mirror plane of symmetry.

The present invention therefore provides a particularly advantageous arrangement of the strain gauges on webs in a structural element, which webs have replaced the outer walls and form a kind of latticework. When a first force acts on the structural element, these webs extend to a significantly greater extent, or shorten to a significantly greater extent, than closed outer walls of a solid or hollow structural element. The device according to the invention thus also makes it possible to measure the effects of small forces on relatively stiff components. Even if the elongations do not correspond to the actual elongations in the structural element without the openings and without the cavity, a conclusion can nevertheless be drawn regarding the locally acting forces. As is sufficiently known to a person skilled in the art, a reconstruction of the strength of an acting force from changes in the length of strain gauges that are not arranged perpendicular or parallel to the first force can be converted, by means of Mohr's circle, into the direction of the acting force.

In a preferred embodiment, a fifth and a sixth strain gauge of the plurality of strain gauges are arranged on the first outer wall, and a seventh and an eighth strain gauge of the plurality of strain gauges are arranged on the second outer wall, in such a manner that, when the structural element is loaded with a torque acting perpendicular to the first force, parallel to the first mirror plane of symmetry, the fifth and seventh strain gauges undergo an identically oriented change in length in the measurement direction, the sixth and eighth strain gauges undergo an identically oriented change in length in the measurement direction, and the change in length of the fifth and seventh strain gauges is converse or opposite to the change in length of the sixth and eighth strain gauges. The fifth, sixth, seventh and eighth strain gauges are likewise arranged on the webs.

Thus, in addition to the first, second, third and fourth strain gauges, this preferred embodiment uses four further strain gauges, which are likewise arranged on the webs. In this case, the fifth and sixth strain gauges are each arranged on one of the webs of the first outer wall, and the seventh and eighth strain gauges are each arranged on one of the webs of the second outer wall. The strain gauges are to be arranged such that, when the structural element is loaded with the torque, the fifth and seventh strain gauges undergo an identically oriented change in length in the measurement direction, and the sixth and eighth strain gauges likewise undergo an identically oriented change in length when the torque acts on the structural element. In this regard, the change in length on the strain gauges arranged on the same outer wall is to be converse or opposite to each other in each case. In other words, the length of the fifth strain gauge changes in the opposite direction to the length of the sixth strain gauge, and the length of the seventh strain gauge changes in the opposite direction to the length of the eighth strain gauge, when the torque acts on the structural element.

The already described torque acting on the structural element acts perpendicular to the first force and parallel to the first mirror plane of symmetry. Such a torque could be generated, for example, in that a force acting parallel to the sectional plane acts via a lever on the structural element, which lever likewise extends parallel to the sectional plane. For example, the torque could be generated by a force, acting parallel to the first force, which acts via a lever on the structural element, which lever extends perpendicular to the force and perpendicular to the first mirror plane of symmetry.

In the preferred exemplary embodiment, the fifth to eighth strain gauges could in each case be arranged parallel to one of the first to fourth strain gauges.

Particularly advantageously, the arrangement of the webs in the first and second outer walls, in combination with the cavity introduced into the structural element, allows separate measurement of the effects of both the torque and the first force, which would not be possible in the case of a solid structural element, or at least in the case of a structural element having closed first and second outer walls.

In a further preferred embodiment, the strain gauges are arranged such that, when the structural element is loaded with the torque, the first and fourth strain gauges undergo an identically oriented change in length in the measurement direction, the second and third strain gauges undergo an identically oriented change in length in the measurement direction, and the change in length of the first and fourth strain gauges is converse or opposite to the change in length of the second and third strain gauges.

The first to fourth strain gauges are then arranged such that, when the torque acts on the structural element, the ratio of the electrical resistance of the first to the second strain gauge remains as similar as possible as the ratio of the electrical resistances of the third and fourth strain gauges. If, for example, the first to fourth strain gauges are the same type of strain gauge, and if they are arranged such that the changes in length, and consequently the changes in resistance, of the first and fourth strain gauges that are caused by the torque are of the same absolute magnitude as the absolute changes in the resistance of the second and third strain gauges, then the ratio of the electrical resistance of the first strain gauge to the electrical resistance of the second strain gauge varies in exactly the same way as the ratio of the electrical resistance of the fourth strain gauge to the electrical resistance of the third strain gauge. If the strain gauges are interconnected to form a Wheatstone bridge, as described above, with the result that they are suitable for measuring the effect of the first force, the action of the torque on the structural element does not result in a measurable voltage drop in the Wheatstone bridge. In other words, the measurement of the effect of the first force by means of the first to fourth strain gauges is decoupled from the measurement of the effect of the torque.

Should the changes not exactly compensate each other, as described by way of example, however, the changes in the resistances of the strain gauges act in opposite directions, with the result that the measurement of the change in resistance across the first four strain gauges should be significantly less than the change in the fifth to eighth strain gauges.

It is furthermore preferred that the strain gauges are arranged such that, when the structural element is loaded with the first force, the fifth and eighth strain gauges undergo an identically oriented change in length in the measurement direction, the sixth and seventh strain gauges undergo an identically oriented change in length in the measurement direction, and the change in length of the fifth and eighth strain gauges is converse or opposite to the change in length of the sixth and seventh strain gauges. This preferred embodiment advantageously decouples the measurement of the effect of the torque on the structural element from the measurement of the effect of the first force. As in the case of the preceding embodiment, the changes in length and resistance of the strain gauges compensate each other.

In a preferred embodiment, the first outer wall has four openings. Four webs, of which a first and a third web extend in a first direction and a second and a fourth web extend in a second direction, extend between the four openings. The second outer wall likewise has four openings. Likewise, four webs, of which a first and a third web extend in the first direction and a second and a fourth web extend in the second direction, extend between these four openings.

There are then four openings going through or interrupting the first and second outer walls, and the webs extending between the openings form an X or a cross on both sides. If the first and the third web are each arranged such that they extend in a first direction, this is to be understood to mean that the third web forms the extension of the first web, and the first and third webs form a line that runs through the point in which the four webs meet, or from which the four webs go out or extend. The first and third webs thus form a continuous connection between different portions of the respective outer wall, or of the structural element, that are otherwise separated from each other by the openings.

Correspondingly, the second and fourth webs are likewise arranged such that they form a line that goes through the point from which all four webs go out or extend, and the second and fourth webs also connect to each other in a line different portions of the respective outer wall, or of the structural element, that are otherwise separated from each other by the openings. The connection in a line enables force to be transmitted between the outer walls, or the structural element, in a uniform manner and fracture points, for example because of kinks or curvatures, are avoided.

It is furthermore preferred that the first direction extends inclined at an angle of 30° to 60°, and preferably of 40° to 50°, in relation to the sectional plane. The second direction is to extend inclined, correspondingly, at an angle of −30° to −60°, and preferably of −40° to −50°, in relation to the sectional plane.

In a further preferred embodiment, the first direction and the second direction are inclined at converse or opposite angles in relation to the sectional plane. In other words, the first direction extends at an angle, in relation to the sectional plane, that is the negative or inverse of the angle at which the first direction extends in relation to the sectional plane. In this way, through suitable interconnection of the strain gauges, torsion and transverse force can be measured, decoupled from each other, in a particularly satisfactory manner.

In a preferred embodiment, the further outer walls comprise a third and a fourth outer wall. The third and fourth outer walls extend in a mirror-symmetrical manner in relation to each other about a second mirror plane of symmetry, and perpendicular to the sectional plane. The second mirror plane of symmetry extends perpendicular to the first mirror plane of symmetry and perpendicular to the sectional plane. A ninth and a tenth strain gauge of the plurality of strain gauges are arranged on the third outer wall, and an eleventh and a twelfth strain gauge of the plurality of strain gauges are arranged on the fourth outer wall, in such a manner that, when the structural element is loaded with a second force acting parallel to the sectional plane and parallel to the second mirror plane of symmetry, the ninth and eleventh strain gauges undergo an identically oriented change in length in the measurement direction, the tenth and twelfth strain gauges undergo an identically oriented change in length in the measurement direction, and the change in length of the ninth and eleventh strain gauges is converse or opposite to the change in length of the tenth and twelfth strain gauges. The third outer wall has, in the region of the cavity, at least three openings, which are separated from each other by webs and connect the cavity to the exterior of the structural element. The fourth outer wall has, in the region of the cavity, at least three openings, which are separated from each other by webs and connect the cavity to the exterior of the structural element. The openings and webs of the third outer wall are arranged in a mirror-symmetrical manner about the second mirror plane of symmetry in relation to the openings and webs of the fourth outer wall. The ninth, tenth, eleventh and twelfth strain gauges are each arranged on one of the webs formed by the third and fourth outer walls. The webs of each outer wall extend away from a common point.

This preferred embodiment, through a targeted weakening of the third and fourth outer walls, makes it possible to measure the effects of a second force on the structural element, which force acts on the structural element perpendicular to the first force and parallel to the sectional plane. However, the openings in the third and fourth outer walls do not just improve the resolution with which the action of the second force can be measured. When the first force or the torque is acting on the structural element, then, in the case of a closed or solid third and fourth outer wall, some of the deformation forces have been absorbed by the third and fourth outer walls. If these outer walls are weakened by the openings, however, the structural element also undergoes greater deformation as a result of the first force and the torque, and the change in length of the webs on the first and second outer walls likewise becomes greater, with the result that lesser forces become measurable.

In this preferred embodiment, it is provided that the further outer walls, which connect the first and second outer walls to each other, comprise at least a third and a fourth outer wall. The third and fourth outer walls can directly adjoin the first and second outer walls. It is also conceivable, however, that further outer walls are arranged, in any shapes, between the first, second, third and fourth outer walls. If the structural element has a rectangular cross-section, the sectional surface corresponds to a rectangular cross-section. If the structural element has a circular cross-section, the sectional surface corresponds to a circular cross-section.

Four further strain gauges are arranged on the third and fourth outer walls, a ninth and a tenth strain gauge on the third outer wall and an eleventh and a twelfth strain gauge on the fourth outer wall. A strain gauge is in each case arranged on the third and on the fourth outer wall such that it extends under the action of the second force, and a further strain gauge is arranged such that it is compressed under the action of the same force. If the second force acts in the opposite direction, the roles of the strain gauges are reversed.

In order to make the elongation and compression of the strain gauges visible when a relatively small second force acts on the structural element, openings are introduced in a mirror-image manner into the third and fourth outer walls, and the strain gauges are arranged on the webs that extend between the openings and that are formed integrally in one piece with the structural element. In this regard, the openings and webs are arranged on the third and fourth outer walls in a surface-symmetrical manner about the second mirror plane of symmetry. In other words, the openings in the third and fourth outer walls are arranged opposite each other.

Like the webs on the first and second outer walls, the webs of the third and fourth outer walls each extend away from a common point. Depending on the number and arrangement of the openings provided, the webs thus form, for example, an X shape, the shape of a cross or the shape of a T. The precise design of the openings and webs is subject to the same considerations that have already been put forward for the alignment of the webs and openings in the first and second outer walls in respect of the first force.

It is furthermore preferred to arrange the strain gauges such that, when the structural element is loaded with the torque, the ninth and twelfth strain gauges undergo an identically oriented change in length in the measurement direction, the tenth and eleventh strain gauges undergo an identically oriented change in length in the measurement direction, and the change in length of the ninth and twelfth strain gauges is converse or opposite to the change in length of the tenth and eleventh strain gauges. In this preferred embodiment, the strain gauges are arranged such that, when interconnected to form a Wheatstone bridge, the changes in resistance of the ninth to twelfth strain gauges become greater under the action of a second force and, insofar as possible, the changes in resistance compensate each other under the action of the torque. The arrangement thus decouples the measurement of the effects of the second force from the effects of the torque on the structural element.

The decoupling is necessary both on the first and second outer walls and on the third and fourth outer walls, since the torque deforms all four outer walls to a similar extent, in particular in the case of a rectangular, square or circular cross-section of the structural element. By contrast, it is not necessary to decouple the measurements of the effect of the first force and that of the second force, since the changes in length that occur on the third and fourth outer walls under the action of the first force are relatively small in comparison with the effects that the first force has on the first and second outer walls. This also applies, conversely, to the second force.

In a preferred embodiment, the third outer wall has four openings, between which four webs extend, of which a first and a third web extend in a third direction, and a second and a fourth web extend in a fourth direction. The second outer wall then likewise has four openings, between which four webs extend, of which a first and a third web extend in the third direction, and a second and a fourth web extend in the fourth direction.

The arrangement of four openings and four webs in a cross or X shape, as has already been described for the first and second outer walls, produces the same advantages here.

It is furthermore preferred that the third direction extends inclined at an angle of 30° to 60°, and preferably of 40° to 50°, in relation to the sectional plane, and that the fourth direction extends inclined at an angle of −30° to −60°, and preferably of −40° to −50°, in relation to the sectional plane. The inclination of the third and fourth directions at the specified angles provides the same advantages that result from the inclination of the first and second directions at the corresponding angles in relation to the sectional plane.

The third direction and the fourth direction are preferably inclined at converse or opposite angles in relation to the sectional plane. The inclination of the third and fourth directions at opposite angles in relation to the sectional plane is also advantageous for the same reasons as the inclination of the first and second directions at opposite angles in relation to the sectional plane.

In a preferred embodiment, the first, second, third and fourth strain gauges are arranged and designed such that, when the first force and/or the torque acts/act on the structural element, changes in length of the first, second, third and fourth strain gauges effect a change of approximately equal magnitude, in amount, in the electrical resistance of the first, second, third and fourth strain gauges. On the one hand, with changes of equal magnitude, in amount, in the electrical resistances of the strain gauges, it is particularly easy to calculate the change in resistance and, on the other hand, also only this results in a complete decoupling of the measurement of the first force and of the torque. The change of equal magnitude, in amount, in the electrical resistance of the first, second, third and fourth strain gauges has the result, if the strain gauges are arranged correspondingly, that the changes in resistance compensate each other and the ratio of the strain gauges interconnected to form a Wheatstone bridge remains equal on both sides and no voltage difference can be determined.

Similarly, it is preferred that the fifth, sixth, seventh and eighth strain gauges are arranged such that, when the first force and/or the torque acts/act on the structural element, changes in length of the fifth, sixth, seventh and eighth strain gauges effect a change of approximately equal magnitude, in amount, in the electrical resistance of the fifth, sixth, seventh and eighth strain gauges. The same advantages result here as for the first to fourth strain gauges in the case of changes of equal magnitude, in amount, in the electrical resistance.

It is therefore likewise preferred that the ninth, tenth, eleventh and twelfth strain gauges are arranged such that, when the second force and/or the torque acts/act on the structural element, changes in length of the ninth, tenth, eleventh and twelfth strain gauges effect a change of approximately equal magnitude, in amount, in the electrical resistance of the ninth, tenth, eleventh and twelfth strain gauges. Here, also, the change of approximately equal magnitude, in amount, in the electrical resistance makes calculation of the changes in resistance significantly easier and, with the strain gauges arranged correspondingly, makes it possible to completely decouple the measurement of the effect of the second force and of the torque on the structural element.

The problem on which the invention is based is additionally solved by a method for measuring sectional forces on a single-piece structural element with respect to a sectional plane by means of a plurality of strain gauges. The structural element has a first and a second outer wall, which extend perpendicular to the sectional plane, extend in a mirror-symmetrical manner in relation to each other about a first mirror plane of symmetry and are connected by further outer walls, wherein the first mirror plane of symmetry extends perpendicular to the sectional plane. Each strain gauge has a measurement direction, and the electrical resistance of the strain gauge is a function of the length of the strain gauge in the measurement direction. The method comprises the following steps:

providing a cavity in the structural element, introducing into the first outer wall, in the region of the cavity, at least three openings, which are separated from each other by webs and connect the cavity to the exterior of the structural element, wherein the webs extend away from a common point, introducing into the second outer wall, in the region of the cavity, at least three openings, which are separated from each other by webs and connect the cavity to the exterior of the structural element, wherein the openings and webs of the first outer wall are arranged in a mirror-symmetrical manner about the first mirror plane of symmetry in relation to the openings and webs of the second outer wall, wherein the webs extend away from a common point, arranging a first and a second strain gauge of the plurality of strain gauges on the webs of the first outer wall, and arranging a third and a fourth strain gauge of the plurality of strain gauges on the webs of the second outer wall, wherein the strain gauges are arranged such that, when the structural element is loaded with a first force acting parallel to the sectional plane and parallel to the first mirror plane of symmetry, the first and third strain gauges undergo an identically oriented change in length in the measurement direction, the second and fourth strain gauges undergo an identically oriented change in length in the measurement direction, and the change in length of the first and third strain gauges is converse or opposite to the change in length of the second and fourth strain gauges, interconnecting the first to fourth strain gauges to form a Wheatstone bridge, wherein the first and second strain gauges are connected in series and parallel to the fourth and third strain gauges, which are likewise connected in series, wherein a voltmeter measures the voltage drop between a node between the first and second strain gauges and a node between the fourth and third strain gauges, applying a supply voltage, which drops across the first and second strain gauges, and also across the fourth and third strain gauges, applying the first force to the structural element, and determining the voltage drop on the voltmeter upon application, or action, of the first force.

In a preferred exemplary embodiment, the method additionally comprises the following steps:

arranging a fifth and a sixth strain gauge of the plurality of strain gauges on the webs of the first outer wall, and arranging a seventh and an eighth strain gauge of the plurality of strain gauges on the webs of the second outer wall, wherein the strain gauges are arranged such that, when the structural element is loaded with a first torque acting perpendicular to the first force and parallel to the first mirror plane of symmetry, the fifth and seventh strain gauges undergo an identically oriented change in length in the measurement direction, the sixth and eighth strain gauges undergo an identically oriented change in length in the measurement direction, and the change in length of the fifth and seventh strain gauges is converse or opposite to the change in length of the sixth and eighth strain gauges, interconnecting the fifth to eighth strain gauges to form a Wheatstone bridge, wherein the fifth and sixth strain gauges are connected in series and parallel to the eighth and seventh strain gauges, which are likewise connected in series, wherein a voltmeter measures the voltage drop between a node between the fifth and sixth strain gauges and a node between the eighth and seventh strain gauges, applying a supply voltage, which drops across the fifth and sixth strain gauges, and also across the eighth and seventh strain gauges, applying the first torque to the structural element, and determining the voltage drop on the voltmeter upon action, or application, of the first torque.

In a preferred embodiment of the method, the structural element comprises a third and a fourth outer wall, which extend in a mirror-symmetrical manner in relation to each other about a second mirror plane of symmetry and run perpendicular to the sectional plane, wherein the second mirror plane of symmetry extends perpendicular to the first mirror plane of symmetry and perpendicular to the sectional plane. Moreover, the method additionally comprises the following steps:

introducing into the third outer wall, in the region of the cavity, at least three openings, which are separated from each other by webs extending away from a common point and connect the cavity to the exterior of the structural element, introducing into the fourth outer wall, in the region of the cavity, at least three openings, which are separated from each other by webs extending away from a common point and connect the cavity to the exterior of the structural element, wherein the openings and webs of the fourth outer wall are introduced in a mirror-symmetrical manner about the second mirror plane of symmetry in relation to the openings and webs of the third outer wall, arranging a ninth and a tenth strain gauge of the plurality of strain gauges on the webs of the third outer wall, and arranging an eleventh and a twelfth strain gauge of the plurality of strain gauges on the webs of the fourth outer wall, in such a manner that, when the structural element is loaded with a second force acting parallel to the sectional plane and parallel to the second mirror plane of symmetry, the ninth and eleventh strain gauges undergo an identically oriented change in length in the measurement direction, the tenth and twelfth strain gauges undergo an identically oriented change in length in the measurement direction, and the change in length of the ninth and eleventh strain gauges is converse or opposite to the change in length of the tenth and twelfth strain gauges, interconnecting the ninth to twelfth strain gauges to form a Wheatstone bridge, wherein the ninth and tenth strain gauges are connected in series and parallel to the twelfth and eleventh strain gauges, which are likewise connected in series, wherein a voltmeter measures the voltage drop between a node between the ninth and tenth strain gauges and a node between the twelfth and eleventh strain gauges, applying a supply voltage, which drops across the ninth and tenth strain gauges, and also across the twelfth and eleventh strain gauges, applying the second force to the structural element, and determining the voltage drop on the voltmeter upon action, or application, of the second force.

The method according to the invention provides the same advantages as the device according to the invention. It can be used for example to determine, on a test stand, the forces and torques exerted by a landing-flap arrangement on a wing or airfoil structure, for example in a spar of a wing.

BRIEF DESCRIPTION OF THE DRAWINGS

The present invention is explained in the following with reference to schematic drawings, which represent two preferred exemplary embodiment. The drawings are show in.

DETAILED DESCRIPTION

Figure 1:
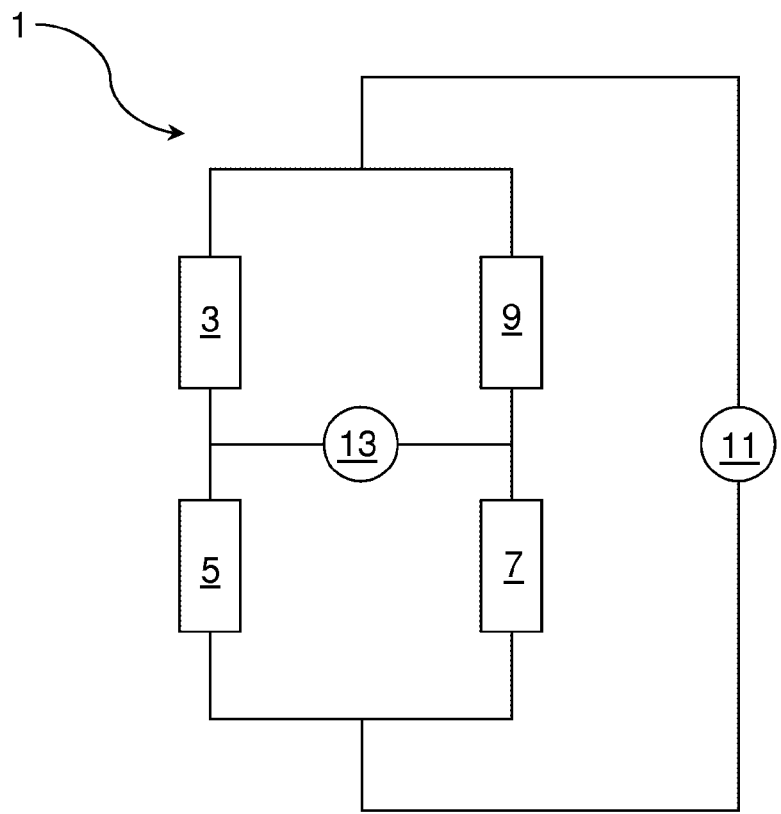
FIG. 1 an exemplary embodiment of a Wheatstone bridge known from the state of the art, FIG. 2 a schematic representation of an exemplary embodiment of a strain gauge, FIG. 3 a perspective view of a first exemplary embodiment of a device according to the invention, FIG. 4 a perspective view of a portion of the first exemplary embodiment, and FIG. 5 a perspective view of a portion of a second exemplary embodiment.
Figure 2:
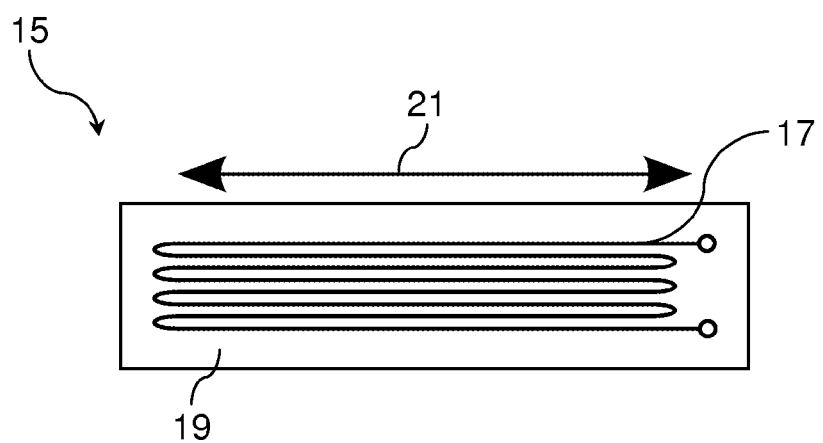

In FIG. 2, firstly, a strain gauge 15 is schematically illustrated. The strain gauge 15 comprises a curved and wound conductor 17, which is arranged in the manner of a loop on a carrier 19. The conductor 17 is wound such that, if there is a change in the length of the carrier 19 in the measurement direction 21, the length of the conductor 17 changes by a multiple of the change in length of the carrier 19. The conductor represented in FIG. 2 has eight windings. The length of the conductor 17, and therefore the electrical resistance of the conductor 17 and of the strain gauge 15 as a whole, thus changes by 8 times compared with a conductor having only the single length of the strain gauge 15. If, on the other hand, the length of the strain gauge 15 is altered perpendicular to the measurement direction 21, i.e. it is compressed or elongated, then the resistance of the conductor 17 changes only insignificantly.

Figure 3:
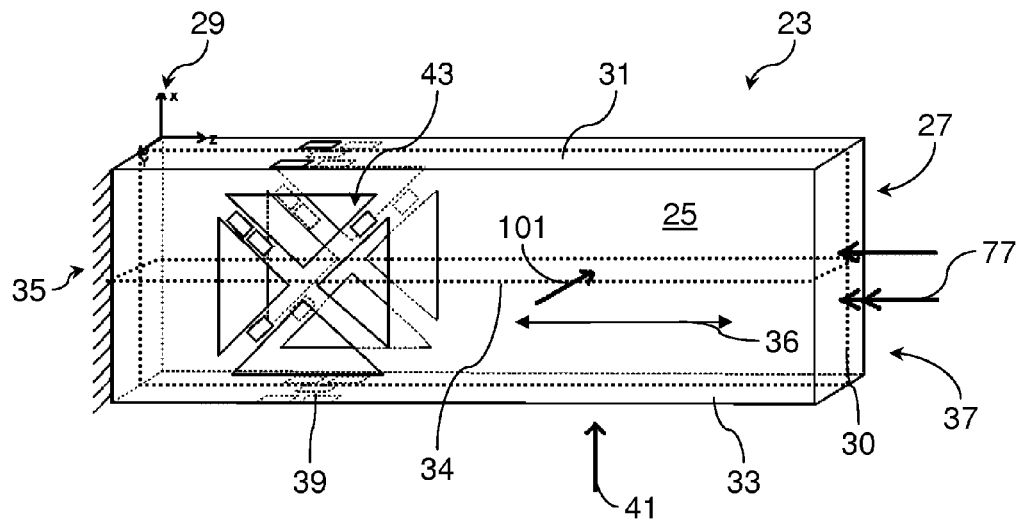

A first exemplary embodiment of a device or apparatus according to the invention is first described with reference to FIGS. 3 and 4. FIG. 3 shows a single-piece structural element 23, which has a right-angled, or rectangular, cross-section. The structural element 23 is a beam subject to bending and comprises a first outer wall 25 and a second outer wall 27, which are located on opposite sides of the structural element 23. In the present exemplary embodiment, the first and second outer walls 25, 27 extend parallel to each other and parallel to the X-Z plane defined by the rectangular coordinate system 29. Moreover, the first and second outer walls 25, 27 are arranged in a surface-symmetrical or mirror-symmetrical manner in relation to each other about a first mirror plane of symmetry 30. The first mirror plane of symmetry 30 extends parallel to the X-Z plane of the coordinate system 29.

The first and second outer walls 25, 27 of the structural element 23 are connected to each other by a third outer wall 31 and a fourth outer wall 33. In the present exemplary embodiment, the third and fourth outer walls 31, 33 extend parallel to each other, perpendicular to the first and second outer walls 25, 27 and parallel to the Y-Z plane of the coordinate system 29. Also extending parallel to the Y-Z plane of the coordinate system 29 is the second mirror plane of symmetry 34, about which the third and fourth outer walls 31, 33 are arranged in a mirror-symmetrical manner. The first to fourth outer walls 25, 27, 31, 33 and the mirror planes of symmetry 30, 34 extend parallel to a direction of extension 36 of the structural element or beam subject to bending 23, which direction of extension 36 extends parallel to the Z axis of the coordinate system 29.

As a beam subject to bending, or bending beam, the structural element 23 comprises a fixed end 35, at which it is immovably mounted or retained. The opposite end 37 is a free end, at which various forces and torques, represented by arrows, act on the structural element 23. The effects of some of these forces and torques are measured, with respect to a sectional plane 39, by means of an exemplary embodiment of a device according to the invention. The sectional plane 39 corresponds to the cross-section of the rectangular structural element 23, thus it extends perpendicular to the mirror planes of symmetry 30, 34 and the direction of extension 36, parallel to the X-Y plane of the coordinate system 29 and, in the present exemplary embodiment, owing to the rectangular cross-section of the structural element 23, also perpendicular to the four outer walls 25, 27, 31, 33.

Firstly, the effect of a first force 41, acting on the free end 37 of the structural element 23, is to be determined in respect of the sectional plane 39. The first force 41 is a transverse force in the sectional plane 39, i.e. it acts on the structural element 23 parallel to the sectional plane 39. The first force 41 additionally acts perpendicular to the first mirror plane of symmetry 30 and, in the present exemplary embodiment, also parallel to the first and second outer walls 25, 27 and, owing to the rectangular cross-section of the structural element 23, perpendicular to the third and fourth outer walls 31, 33. With reference to the coordinate system 29, the first force 41 acts in the X direction.

According to the invention, a cavity 43 has been introduced into the structural element 23, in order to be better able to measure the effects of the first force 41 on the structural element 23. The portion of the structural element 23 provided with the cavity 43 is illustrated in detail in FIG. 4, to which reference is made in particular in the following. Moreover, introduced into the first outer wall 25 there are four openings 45, which connect the cavity 43 to the environment of the structural element 23 and which are separated from each other by four webs 47, 49, 51, 53. The second outer wall 27 likewise has four openings 55, which likewise connect the cavity 43 to the environment or to the exterior of the structural element 23 and which are separated from each other by four webs 57, 59, 61, 63. The openings 45 and webs 47, 49, 51, 53 of the first outer wall 25 are in each case arranged opposite the openings 55 and webs 57, 59, 61, 63 respectively of the second outer wall, in such a manner that the first and second outer walls 25, 27 have a mirror-symmetrical appearance, wherein the first mirror plane of symmetry 30 defines the plane of symmetry.

The webs 47, 49, 51, 53, 57, 59, 61, 63 of each of the two outer walls 25, 27 go out or extend from a common point and are arranged in the shape of an X. A first and a third web 47, 51, 57, 61 extend in each case in a first direction 65, and a second and a fourth web 49, 53, 59, 63 extend in a second direction 67. Since two of the webs 47, 49, 51, 53, 57, 59, 61, 63 in each case extend in the same direction 65, 67, force can be transmitted in a uniform manner between the regions of the structural element 23 that do not have a cavity 43 and in which the outer walls 25, 27, 31, 33 are not interrupted by openings 45, 55.

The first and second directions 65, 67 are inclined at converse or opposite angles in relation to the sectional plane 39. In the present example, the first direction 65 is inclined at an angle of 45° in relation to the sectional plane 39, and the second direction 67 is inclined at an angle of −45° in relation to the sectional plane 39. An inclination of the first and second directions 65, 67 by 45° in relation to the sectional plane 39 enables the forces and torques to be transmitted in the structural element 23 in a particularly uniform manner. Further advantages of the inclination of the directions 65, 67, and consequently of the webs 47, 49, 51, 53, 57, 59, 61, 63, are also evident from the description that follows.

Four strain gauges 69, 71, 73, 75 are arranged on the structural element for the purpose of measuring the effects of the first force 41. A first strain gauge 69 and a second strain gauge 71 are arranged on the first outer wall 25. The first strain gauge 69 is arranged on the first web 47, and the second strain gauge 71 is arranged on the fourth web 53. The measurement direction of the strain gauges 69, 71 in this case corresponds to the direction of extension 65, 67 of the respective web 47, 53. A third strain gauge 73 is arranged with its measurement direction parallel to the first direction 65 on the first web 57 of the second outer wall 27, and the fourth strain gauge 75 is arranged on the fourth web 63 of the second outer wall 27. The measurement direction of the fourth strain gauge 75 extends along the second direction 67.

When the first force 41 acts on the free end 37 of the structural element 23 the latter deforms, and the first and second outer walls 25, 27 and, in particular, the webs 47, 49, 51, 53, 57, 59, 61, 63 undergo elongation or compression. In the present example, the first force 41 causes the first webs 47, 57 to be compressed and the fourth webs 53, 63 to be stretched. With the webs 47, 49, 51, 53, 57, 59, 61, 63, the length of the corresponding strain gauges 69, 71, 73, 75 in the measurement direction, and thus their electrical resistance, also alters.

When the first force 41 acts on the structural element 23, the electrical resistance of the first and third strain gauges 69, 73 is reduced, and the resistance of the second and fourth strain gauges 71, 75 is increased. If the four strain gauges 69, 71, 73, 75 are interconnected to form a Wheatstone bridge 1 in such a manner that the first strain gauge 69 takes the place of the first resistor 3, the second strain gauge 71 takes the place of the second resistor 5, the third strain gauge 73 takes the place of the third resistor 7, and the fourth strain gauge 75 takes the place of the fourth resistor 9, then the first and second resistors 3, 5 and the fourth and third resistors 7, 9 have differing ratios to each other, and there is a voltage drop across the voltmeter 13, from the magnitude of which it is possible to calculate the change in the resistances. Preferably, the strain gauges 69, 71, 73, 75 have the same resistance when having the same extension and, under the action of the first force 41, this resistance changes by the same absolute amount, with the result that it is particularly easy to calculate the change in resistance.

Figure 4:
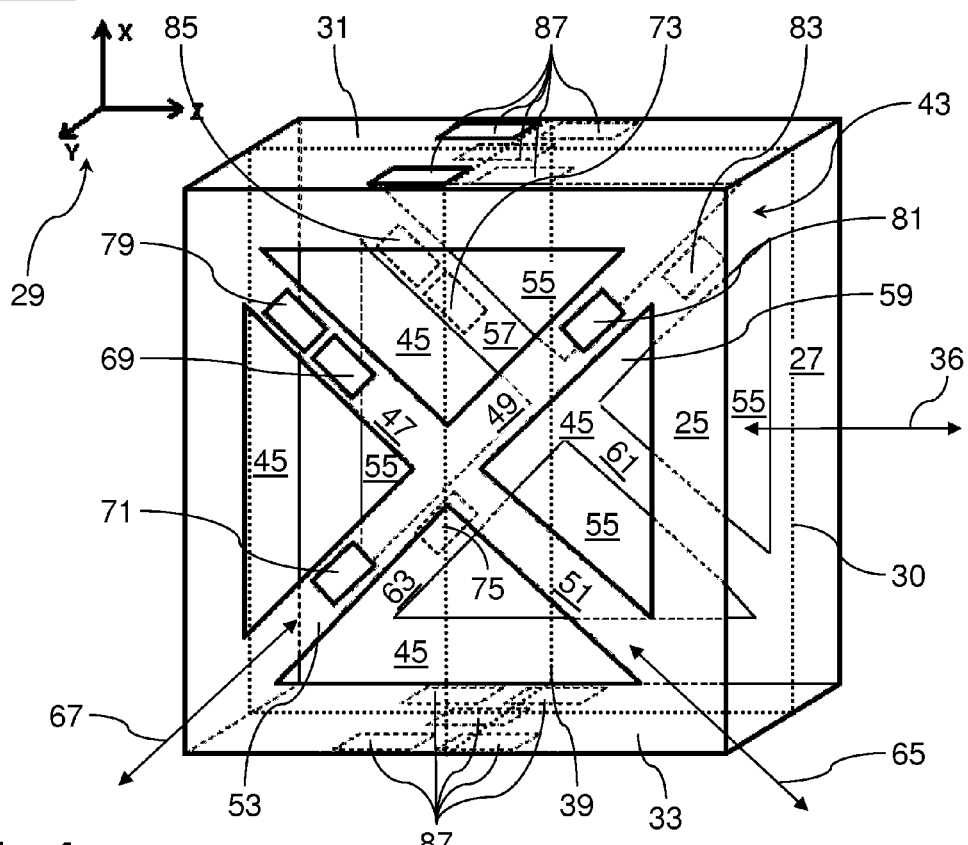

The exemplary embodiment illustrated in FIGS. 3 and 4 thus represents a possibility for measuring the effect of the first force 41 on the structural element 23, even when the magnitude of the first force 41 would not result in any measurable changes or distortions of the surface of the outer walls 25, 27 in the case of a solid structural element 23.

The arrangement of the strain gauges 69, 71, 73, 75 in the form described also has a further advantage. If a torque 77 acts on the structural element 23, perpendicular to the first force 41 and parallel to the direction of extension 36, the length of the webs 47, 49, 51, 53, 57, 59, 61, 63 of the first and second outer walls 25, 27 changes likewise. Consequently, the resistance of the strain gauges 69, 71, 73, 75 also changes.

However, the arrangement of the strain gauges 69, 71, 73, 75 is selected just such that, under the action of the torque 77, the first and fourth strain gauges 69, 75 undergo an identically oriented change in length and the second and third strain gauges 71, 73 likewise undergo an identically oriented change in length, which, however, is opposite to the change in length of the first and fourth strain gauges 69, 75. This means that the ratio of the resistances of the strain gauges 69, 71, 73, 75 in the Wheatstone bridge does not change, and the voltmeter 13 therefore does not indicate any change in the resistances, or indicates only a very slight change. This is the case, in particular, when the resistance of the strain gauges 69, 71, 73, 75 changes by the same absolute amount. The arrangement of the strain gauges 69, 71, 73, 75 on the webs 47, 53, 57, 63 thus not only makes it possible to measure a relatively small first force 41, but is also decoupled from the influences of the torque 77.

If a force opposed to the first force 41 acts on the structural element 23, then, obviously, the lengths of the webs 47, 49, 51, 53, 57, 59, 61, 63 and of the strain gauges 69, 71, 73, 75 arranged on them change in opposite directions.

In a particularly advantageous manner, the arrangement of the webs 47, 49, 51, 53, 57, 59, 61, 63 also makes it possible to measure the torque 77 decoupled from the first force 41. For this purpose, a fifth strain gauge 79, the measurement direction of which is the first direction 65, is arranged on the first web 47 of the first outer wall 25. A sixth strain gauge 81, the measurement direction of which is the second direction 67, is arranged on the second web 49 of the first outer wall 25. A seventh strain gauge 83 and an eighth strain gauge 85 are arranged on the webs 57 and 59 of the second outer wall 27. The seventh strain gauge 83 is arranged, oriented in the second direction 67, on the second web 59 of the second outer wall 27. The eighth strain gauge 85 is arranged, oriented in the first direction 65, on the first web 57 of the second outer wall 27.

If the torque 77 acts on the structural element 23, the length of the fifth and seventh strain gauges 79, 83 and of the webs 47, 59 changes in the same direction. Correspondingly, the resistance of the fifth and seventh strain gauges 79, 83 also changes in the same direction. The length, and therefore also the electrical resistance, of the sixth and eighth strain gauges 81, 85 changes in the opposite direction. If the strain gauges 79, 81, 83, 85 are interconnected to form a Wheatstone bridge 1, then, under the action of the torque 77 on the structural element 23, the ratio of the resistances changes, and the voltmeter 13 indicates a voltage drop, from which the change in resistance can be calculated.

Preferably, under the action of the torque 77 on the structural element 23, the resistance of the strain gauges 79, 81, 83, 85 changes by the same amount. This enables the change in the resistance, and therefore the change in the length, of the strain gauges 79, 81, 83, 85 to be calculated particularly easily.

The arrangement of the strain gauges 79, 81, 83, 85 of the exemplary embodiment illustrated in FIGS. 3 and 4 thus makes it possible, particularly advantageously, to calculate also the effects of small torques 77 on the structural element 23 that, without the cavity 43 and the openings 45, 55, would not cause any measurable distortions of the surface of the structural element 23. The inclination of the first and second directions 65, 67 by 45° and −45°, respectively, in relation to the sectional plane, and therefore also by 45° and −45°, respectively, in relation to the torque 77, is particularly advantageous, since the effects of the torque 77 on the first and second outer walls 25, 27 can be broken down, by means of Mohr's circle, into two main components, of which one acts in the first direction 65 and the second acts in the second direction 67.

Moreover, the arrangement of the strain gauges 79, 81, 83, 85 according to the invention offers the advantage that the measurement of the effect of the torque 77 on the structural element 23 is decoupled from the measurement of the effect of the first force 41. If the first force 41 acts on the structural element 23, the resistances of the fifth and eighth strain gauges 79, 85 change in the same direction, and the resistances of the sixth and seventh strain gauges 81, 83 change in the opposite direction. If these strain gauges are connected in a Wheatstone bridge 1, as has just been described, the ratio of the resistances 3, 5, 7, 9 does not change, and the voltmeter 13 does not measure any voltage drop.

The exemplary embodiment illustrated in FIGS. 3 and 4 thus represents a possibility for measuring the first force 41 and the torque 77 independently of each other, also on a structural element 23 that, without the introduced openings 45, 55 and the introduced cavity 43, would be so stiff that the changes in length on the surface, with strain gauges applied, would be too slight to allow measurement of the forces.

For a person skilled in the art, it is evident that the strain gauges 69, 71, 73, 75, 79, 81, 83, 85 can also be arranged on other webs 47, 49, 51, 53, 57, 59, 61, 63 in order to achieve the same result. Also conceivable is a different arrangement of the webs 47, 49, 51, 53, 57, 59, 61, 63, for example at different angles of inclination in relation to the sectional plane 39. The arrangement described here is merely an example, and is one of several arrangements that fulfils the principle of the invention defined in the claims.

In FIGS. 3 and 4 yet further strain gauges 87 are represented, by means of which the effects of further forces and torques on the structural element 23 can be measured. However, the arrangement of the further strain gauges 87 is sufficiently known to a person skilled in the art from the state of the art. It is therefore not described in greater detail here.

Figure 5:
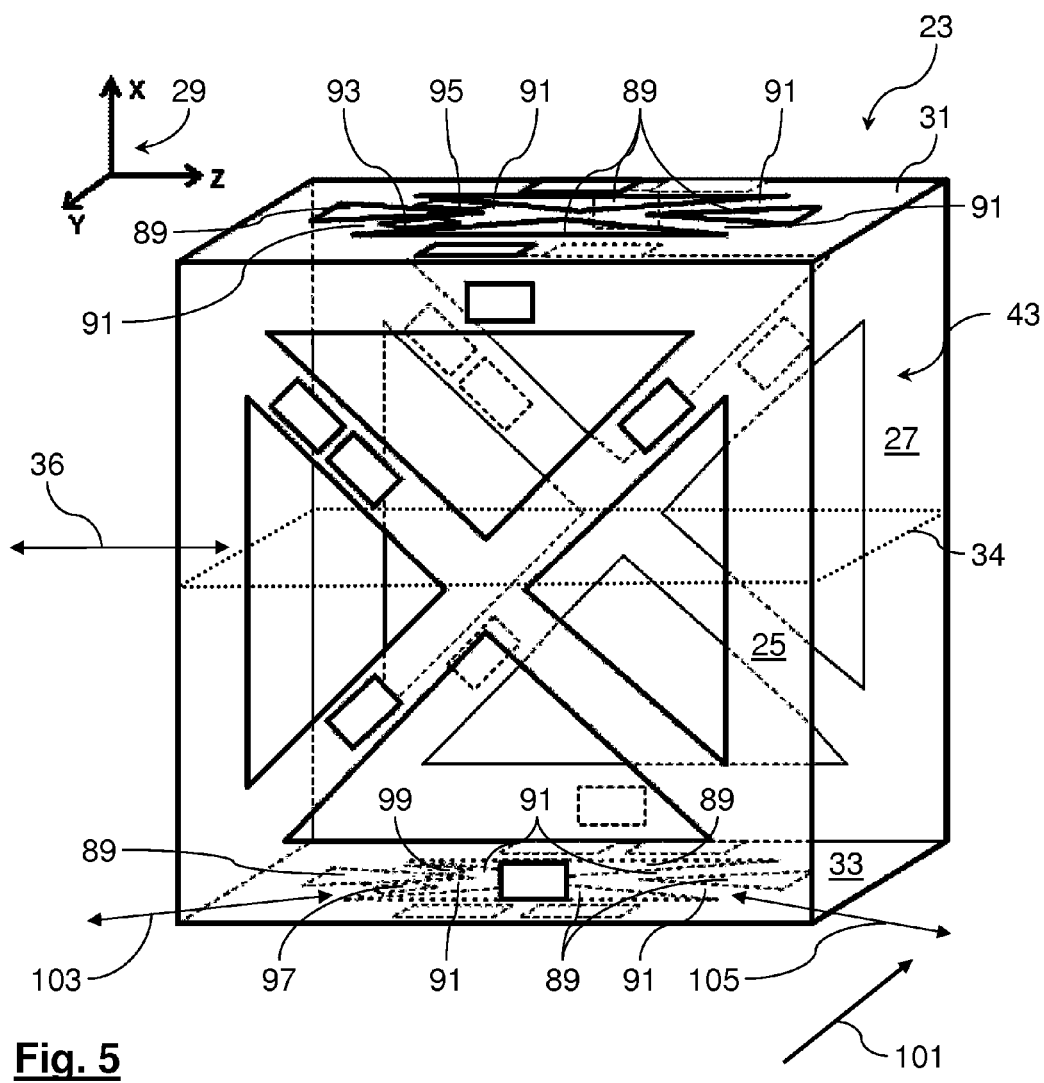

A second exemplary embodiment of a device or apparatus according to the invention is described in the following with reference to FIG. 5. The same reference numbers in the drawings denote corresponding elements. The structural element 23 illustrated in FIG. 5 is the same structural element 23 that has already been illustrated in FIG. 4. It comprises the same openings and webs on the first and on the second outer wall 25, 27, which also fulfil the same purpose. These are therefore not described in greater detail in the following.

In the exemplary embodiment illustrated in FIG. 5, four openings 89 have additionally been introduced into each of the third and fourth outer walls 31, 33. Four webs 91 extend between the openings. A strain gauge 93, 95, 97, 99 is in each case arranged on two webs 91 of the third outer wall 31 and of the fourth outer wall 33, to enable measurement of the effects of the action of a second force 101 on the structural element 23. The second force 101 acts, perpendicular to the first force 41 and to the torque 77, on the free end 37 of the structural element 23.

In this regard, the strain gauges 93, 95, 97, 99 are arranged such that the resistances of a ninth and a tenth strain gauge 93, 95, which are arranged on the third outer wall 31, change in opposite directions when the second force 101 acts on the free end 37 of the structural element 23. The eleventh and twelfth strain gauges 97, 99 are arranged on the webs 91 of the fourth outer wall 33 such that, under the action of the second force 101, their resistances likewise change in opposite directions. The strain gauges 93, 95, 97, 99 can be interconnected to form a Wheatstone bridge such that, under the action of the second force 101, the ratio of the resistances changes in opposite directions, and a particularly large voltage drop can be measured.

The ninth and eleventh strain gauges 93, 97 are aligned in a third direction 103, and the tenth and twelfth strain gauges 95, 99 are aligned in a fourth direction 105. Of the four webs 91 that extend between the openings 89 of the third and fourth outer walls 31, 33, in each case two webs 91 extend in the third direction 103 and two webs 91 extend in the fourth direction 105. The directions 103, 105 in which the webs 91 extend correspond in this case to the directions 103, 105 in which the measurement directions of the strain gauges 93, 95, 97, 99 arranged on the webs 91 are aligned. Moreover, the webs 91 are preferably inclined at converse or opposite angles in relation to the sectional plane 39.

The openings 91 make it possible to measure even second forces 101 that would not deform a solid structural element 23 or, also, a structural element 23 having a cavity 43 but closed third and fourth outer walls 31, 33 sufficiently to allow measurement of a sufficiently large change in resistance.

The arrangement of the strain gauges 93, 95, 97, 99 is also advantageous because, under the action of the torque 77, their resistances change in such a manner that the ratio of the resistances of the above-mentioned Wheatstone bridge does not change. Particularly advantageously, therefore, the measurement of the second force 101 is decoupled from the measurement of the torque 77.

The invention claimed is:

1. A device for measuring sectional forces on a single-piece structural element in respect of a sectional plane by a plurality of strain gauges,
    wherein the structural element comprises a first and a second outer wall, which extend perpendicular to the sectional plane, extend in a mirror-symmetrical manner in relation to each other about a first mirror plane of symmetry and are connected by further outer walls, wherein the first mirror plane of symmetry extends perpendicular to the sectional plane,
    wherein each strain gauge has at least one associated measurement direction as well as a nominal length and electrical resistance, and the electrical resistance of the strain gauge depends on the length of the strain gauge in the measurement direction,
    wherein a first and a second strain gauge of the plurality of strain gauges are arranged on the first outer wall, and a third and a fourth strain gauge of the plurality of strain gauges are arranged on the second outer wall,
    wherein the strain gauges are arranged such that, when the structural element is loaded with a first force acting parallel to the sectional plane and parallel to the first mirror plane of symmetry, the first and third strain gauges undergo an identically oriented change in length in the measurement direction, the second and fourth strain gauges undergo an identically oriented change in length in the measurement direction, and the change in length of the first and third strain gauges is opposite to the change in length of the second and fourth strain gauges,
    wherein,
    the structural element comprises a cavity,
    the first outer wall comprises, in a region of the cavity, at least three openings, which are separated from each other by webs and connect the cavity to an exterior of the structural element, the second outer wall comprises, in a region of the cavity, at least three openings, which are separated from each other by webs and connect the cavity to an exterior of the structural element, and the openings and webs of the first outer wall are arranged in a mirror-symmetrical manner about the first mirror plane of symmetry in relation to the openings and webs of the second outer wall,
    the first, second, third and fourth strain gauges are each arranged on one of the webs, and
    the webs of each outer wall extend away from a common point.

2. The device according to claim 1, wherein a fifth and a sixth strain gauge of the plurality of strain gauges are arranged on the first outer wall, and a seventh and an eighth strain gauge of the plurality of strain gauges are arranged on the second outer wall, in such a manner that, when the structural element is loaded with a torque acting perpendicular to the first force and parallel to the first mirror plane of symmetry, the fifth and seventh strain gauges undergo an identically oriented change in length in the measurement direction, the sixth and eighth strain gauges undergo an identically oriented change in length in the measurement direction, and the change in length of the fifth and seventh strain gauges is opposite to the change in length of the sixth and eighth strain gauges, and
    wherein the fifth, sixth, seventh and eighth strain gauges are each arranged on one of the webs.

3. The device according to claim 2, wherein the strain gauges are arranged such that, when the structural element is loaded with the first force, the fifth and eighth strain gauges undergo an identically oriented change in length in the measurement direction, the sixth and seventh strain gauges undergo an identically oriented change in length in the measurement direction, and the change in length of the fifth and eighth strain gauges is opposite to the change in length of the sixth and seventh strain gauges.

4. The device according to claim 1, wherein the strain gauges are arranged such that, when the structural element is loaded with the torque, the first and fourth strain gauges undergo an identically oriented change in length in the measurement direction, the second and third strain gauges undergo an identically oriented change in length in the measurement direction, and the change in length of the first and fourth strain gauges is opposite to the change in length of the second and third strain gauges.

5. The device according to claim 1, wherein the first outer wall comprises four openings, between which four webs extend, of which a first and a third web extend in a first direction, and a second and a fourth web extend in a second direction, and
wherein the second outer wall comprises four openings, between which four webs extend, of which a first and a third web extend in the first direction, and a second and a fourth web extend in the second direction.

6. The device according to claim 5, wherein the first direction extends inclined at an angle of 30° to 60° in relation to the sectional plane, and
wherein the second direction extends inclined at an angle of −30° to −60° in relation to the sectional plane.

7. The device according to claim 5, wherein the first direction and the second direction are inclined at opposite angles in relation to the sectional plane.

8. The device according to claim 1, wherein the further outer walls comprise a third and a fourth outer wall, which extend in a mirror-symmetrical manner in relation to each other about a second mirror plane of symmetry and perpendicular to the sectional plane, wherein the second mirror plane of symmetry extends perpendicular to the first mirror plane of symmetry and perpendicular to the sectional plane,
wherein a ninth and a tenth strain gauge of the plurality of strain gauges are arranged on the third outer wall, and an eleventh and a twelfth strain gauge of the plurality of strain gauges are arranged on the fourth outer wall, in such a manner that, when the structural element is loaded with a second force acting parallel to the sectional plane and parallel to the second mirror plane of symmetry, the ninth and eleventh strain gauges undergo an identically oriented change in length in the measurement direction, the tenth and twelfth strain gauges undergo an identically oriented change in length in the measurement direction, and the change in length of the ninth and eleventh strain gauges is opposite to the change in length of the tenth and twelfth strain gauges,
wherein the third outer wall comprises, in the region of the cavity, at least three openings, which are separated from each other by webs and connect the cavity to the exterior of the structural element, the fourth outer wall comprises, in the region of the cavity, at least three openings, which are separated from each other by webs and connect the cavity to the exterior of the structural element, and the openings and webs of the third outer wall are arranged in a mirror-symmetrical manner about the second mirror plane of symmetry in relation to the openings and webs of the fourth outer wall,
the ninth, tenth, eleventh and twelfth strain gauges are each arranged on one of the webs formed by the third and fourth outer walls, and
the webs of the third and fourth outer walls each extend away from a common point.

9. The device according to claim 8, wherein the strain gauges are arranged such that, when the structural element is loaded with the torque, the ninth and twelfth strain gauges undergo an identically oriented change in length in the measurement direction, the tenth and eleventh strain gauges undergo an identically oriented change in length in the measurement direction, and the change in length of the ninth and twelfth strain gauges is opposite to the change in length of the tenth and eleventh strain gauges.

10. The device according to claim 8, wherein the third outer wall comprises four openings, between which four webs extend, of which a first and a third web extend in a third direction, and a second and a fourth web extend in a fourth direction, and
wherein the second outer wall comprises four openings, between which four webs extend, of which a first and a third web extend in a third direction, and a second and a fourth web extend in a fourth direction.

11. The device according to claim 10, wherein the third direction extends inclined at an angle of 30° to 60° in relation to the sectional plane (39), and
wherein the fourth direction extends inclined at an angle of −30° to −60° in relation to the sectional plane.

12. The device according to claim 10, wherein the third direction and the fourth direction are inclined at opposite angles in relation to the sectional plane.

13. The device according to claim 1, wherein the first, second, third and fourth strain gauges are arranged such that changes in length of the first, second, third and fourth strain gauges upon the first force or the torque acting on the structural element effect a change of approximately equal magnitude, in amount, in the electrical resistance of the first, second, third and fourth strain gauges, or
wherein the fifth, sixth, seventh and eighth strain gauges are arranged such that changes in length of the fifth, sixth, seventh and eighth strain gauges upon the first force or the torque acting on the structural element effect a change of approximately equal magnitude, in amount, in the electrical resistance of the fifth, sixth, seventh and eighth strain gauges, or
wherein the ninth, tenth, eleventh and twelfth strain gauges are arranged such that changes in length of the ninth, tenth, eleventh and twelfth strain gauges upon the second force or the torque acting on the structural element effect a change of approximately equal magnitude, in amount, in the electrical resistance of the ninth, tenth, eleventh and twelfth strain gauges.

14. A method for measuring sectional forces on a single-piece structural element in respect of a sectional plane by a plurality of strain gauges, the method comprising;
providing a device for measuring sectional forces on a single-piece structural element in respect of a sectional plane by a plurality of strain gauges:
wherein the structural element comprises a first and a second outer wall, which extend perpendicular to the sectional plane, extend in a mirror-symmetrical manner in relation to each other about a first mirror plane of symmetry and are connected by further outer walls, wherein the first mirror plane of symmetry extends perpendicular to the sectional plane, wherein each strain gauge has a measurement direction, and the electrical resistance of the strain gauge depends on the length of the strain gauge in the measurement direction, wherein a first and a second strain gauge of the plurality of strain gauges are arranged on the first outer wall, and a third and a fourth strain gauge of the plurality of strain gauges are arranged on the second outer wall, wherein the strain gauges are arranged such that, when the structural element is loaded with a first force acting parallel to the sectional plane and parallel to the first mirror plane of symmetry, the first and third strain gauges undergo an identically oriented change in length in the measurement direction, the second and fourth strain gauges undergo an identically oriented change in length in the measurement direction, and the change in length of the first and third strain gauges is opposite to the change in length of the second and fourth strain gauges, wherein, the structural element comprises a cavity, the first outer wall comprises, in a region of the cavity, at least three openings, which are separated from each other by webs and connect the cavity to an exterior of the structural element, the second outer wall comprises, in the region of the cavity, at least three openings, which are separated from each other by webs and connect the cavity to the exterior of the structural element, and the openings and webs of the first outer wall are arranged in a mirror-symmetrical manner about the first mirror plane of symmetry in relation to the openings and webs of the second outer wall, the first, second, third and fourth strain gauges are each arranged on one of the webs, and the webs of each outer wall extend away from a common point;

interconnecting the first to fourth strain gauges to form a Wheatstone bridge, wherein the first and second strain gauges are connected in series and parallel to the fourth and third strain gauges, which are likewise connected in series, wherein a voltmeter measures the voltage drop between a node between the first and second strain gauges and a node between the fourth and third strain gauges, applying a supply voltage, which drops across the first and second strain gauges, and also across the fourth and third strain gauges, applying the first force to the structural element, and determining the voltage drop on the voltmeter upon action of the first force.

15. The method according to claim 14, wherein the structural element further comprises a third and a fourth outer wall, which extend in a mirror-symmetrical manner in relation to each other about a second mirror plane of symmetry and extend perpendicular to the sectional plane, wherein the second mirror plane of symmetry extends perpendicular to the first mirror plane of symmetry and perpendicular to the sectional plane, and wherein the method additionally comprises:

introducing into the third outer wall, in the region of the cavity, at least three openings, which are separated from each other by webs extending away from a common point and connect the cavity to the exterior of the structural element, introducing into the fourth outer wall, in the region of the cavity, at least three openings, which are separated from each other by webs extending away from a common point and connect the cavity to the exterior of the structural element, wherein the openings and webs of the fourth outer wall are arranged in a mirror-symmetrical manner about the second mirror plane of symmetry in relation to the openings and webs of the third outer wall, arranging a ninth and a tenth strain gauge of the plurality of strain gauges on the webs of the third outer wall, and arranging an eleventh and a twelfth strain gauge of the plurality of strain gauges on the webs of the fourth outer wall in such a manner that, when the structural element is loaded with a second force acting parallel to the sectional plane and parallel to the second mirror plane of symmetry, the ninth and eleventh strain gauges undergo an identically oriented change in length in the measurement direction, the tenth and twelfth strain gauges undergo an identically oriented change in length in the measurement direction, and the change in length of the ninth and eleventh strain gauges is opposite to the change in length of the tenth and twelfth strain gauges, interconnecting the ninth to twelfth strain gauges to form a Wheatstone bridge, wherein the ninth and tenth strain gauges are connected in series and parallel to the twelfth and eleventh strain gauges , which are likewise connected in series, wherein a voltmeter measures the voltage drop between a node between the ninth and tenth strain gauges and a node between the twelfth and eleventh strain gauges, applying a supply voltage, which drops across the ninth and tenth strain gauges, and also across the twelfth and ninth strain gauges, applying the second force to the structural element, and determining the voltage drop on the voltmeter upon action of the second force.

* * * * *